May 27, 1930. S. W. DEAN 1,759,938
COORDINATION OF DIRECTION FINDER OBSERVATIONS
Filed April 20, 1929
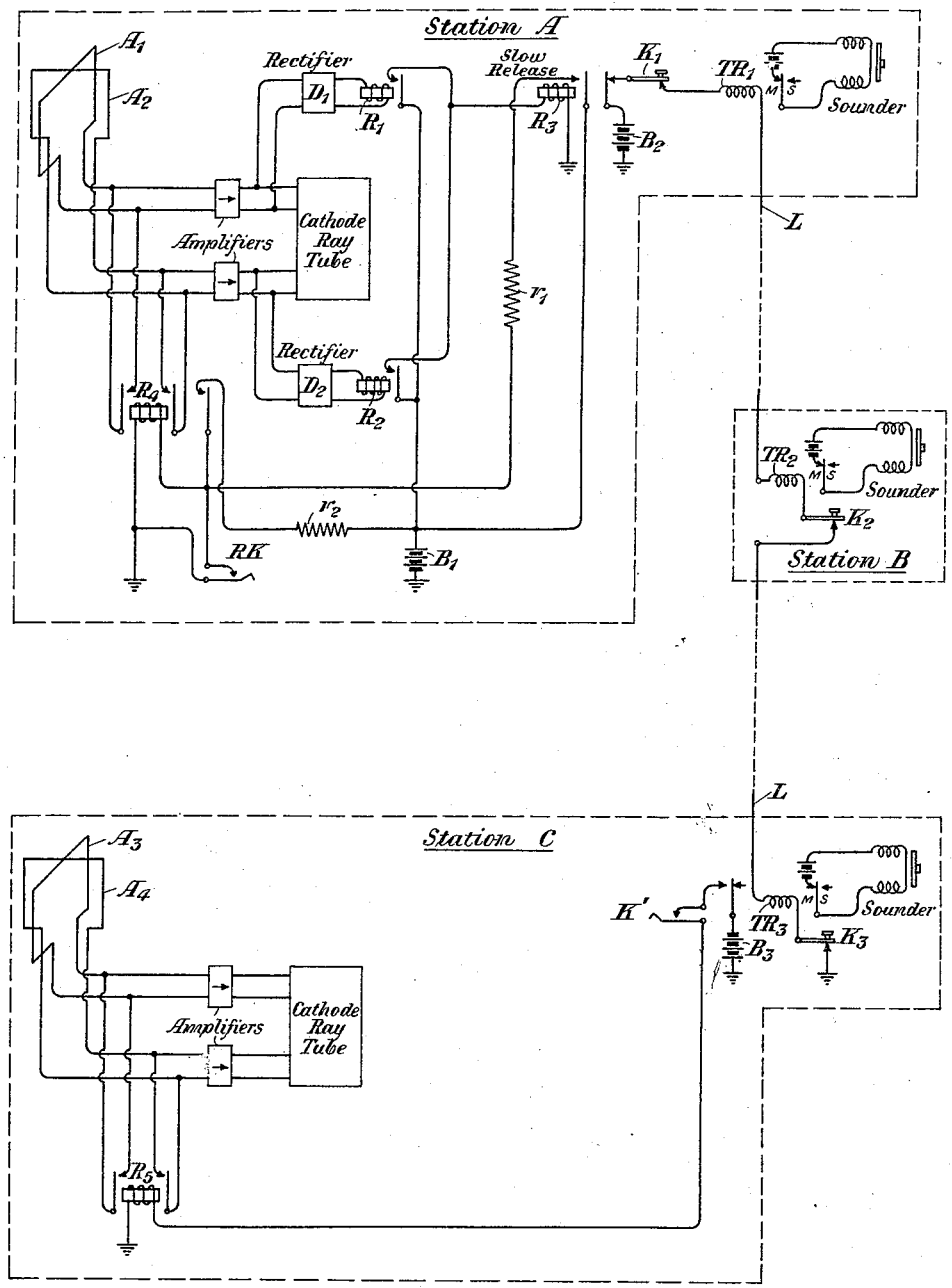
INVENTOR
S. W. Dean
BY
ATTORNEY Patented May 27, 1930

1,759,938

UNITED STATES PATENT OFFICE

SAMUEL W. DEAN, OF BROOKLYN, NEW YORK, ASSIGNOR TO AMERICAN TELEPHONE AND TELEGRAPH COMPANY, A CORPORATION OF NEW YORK

COORDINATION OF DIRECTION-FINDER OBSERVATIONS

Application filed April 20, 1929. Serial No. 356,786.

This invention relates to methods of and means for locating sources of static disturbances, and, more particularly, to the coordination of observations made at a plurality of geographically separated stations.

For the purpose of correlating static and weather conditions, and in connection with the study of the effect of static upon radio circuits, it is desirable that observations of the direction of static be made simultaneously at two or more points; the sources of the static disturbances can then be determined by triangulation. The device most suitable for these observations is the cathode ray direction finder. With the use of the cathode ray direction finder in this type of observation, it is necessary to establish communication between the observing stations such that observations at the several stations may be identified with individual crashes of static.

It is the principal object of my invention to provide for improved communication between the several direction observing stations with a view to certainty of identification of observed crashes and greater accuracy of location of the sources of disturbances.

In general, in attaining the above-stated object, I employ an arrangement whereby a signal is sent out automatically from a control station to the other stations in response to an observed crash of static and the closely subsequent response of the control station apparatus to other crashes, which might confuse the identification of an individual crash, is prevented.

My invention will be clearly understood when the following detailed description of a desirable form thereof is read with reference to the accompanying drawing, which shows diagrammatically, and, in part, schematically, the apparatus involved.

With reference to the details of the drawing, there is shown a communication system connecting stations A, B and C, which represent any suitable number of stations at which observations are made of static crashes with a view to location by triangulation of the sources of the static disturbances. The complete apparatus of the control station is shown either diagrammatically or schematically at station A; at station B there is shown only as much of the apparatus which would be found at that station as is necessary to an understanding of the nature and operation of my system; at station C, there is indicated the apparatus which will be found at an observation station other than the control station including a certain desirable but unessential modification to be considered more fully hereinafter.

At station A, there are shown schematically two loop antennæ $A_1$ and $A_2$ associated with amplifiers and a cathode ray tube, all this apparatus being well understood by those skilled in the art to be the ordinary cathode ray direction finder apparatus. Across the outputs of the amplifiers I bridge the rectifiers or detectors $D_1$ and $D_2$. To the output of rectifier $D_1$ there is connected a relay $R_1$, and, likewise, a relay $R_2$ is connected in the output of rectifier $D_2$. These relays may be adjusted so that whenever a static crash is received with sufficient intensity on either loop of station A to be observed, one or both of the relays $R_1$ and $R_2$ will be operated for the duration of the crash. Upon the operation of one or both of these relays, a battery $B_1$ is connected in circuit with the winding of a slow-release relay $R_3$, and this relay will operate to complete a circuit through battery $B_1$, the left-hand armature of relay $R_3$, resistance $r_1$ and the winding of a relay $R_4$. When relay $R_4$ operates, a locking circuit is completed through its right-hand armature, resistance $r_2$ and battery $B_1$, and, accordingly, the relay $R_4$ is held operated until the observer closes the normally open key RK. The operation of relay $R_4$ places short circuits on the inputs of the amplifiers associated with the antennæ $A_1$ and $A_2$ and the cathode ray tube, and, accordingly, any subsequent static crashes (occurring before the operation of key RK) will have no effect on the apparatus of station A.

When relay $R_3$ operates in response to the operation of one or both of the relays $R_1$ and $R_2$, a telegraph circuit is opened at the right-hand contact of the relay. This telegraph circuit includes the battery $B_2$, the right-hand armature of relay $R_3$, a telegraph key $K_1$, the winding of the telegraph relay $TR_1$, the telegraph line L and the apparatus at stations B and C. The time during which this circuit remains open is, of course, determined by the slow-release characteristic of relay $R_3$. When the circuit is opened in response to the observation of a static crash at station A and the operation of relay $R_3$, the telegraph relays of all the stations ($TR_1$, $TR_2$ and $TR_3$) will operate through their respective armatures from marking contact to spacing contact and cause the operation of the sounders. The clicking of the sounders at all the stations serves to signal to the observers that the accompanying static crash is to be observed.

Each observer, having made a mental note of the observation of the crash which accompanied the signal from station A, passes his results on to the recorder, who may be at any one of the observing stations, over the telegraph circuit, operating key $K_1$, $K_2$ or $K_3$, as the case may be. When all stations have communicated the results to the recorder, the observer at the control station A closes the key RK, releasing relay $R_4$ and putting the observing apparatus in condition for another observation.

While a telegraph line has been specifically disclosed, it will be understood by those skilled in the art that a telephone line instead might well be used to connect the various observation stations, the relay $R_3$ operating to place a characteristic tone on the telephone circuit as the signal to the operators at stations B and C.

In some cases, it may prove desirable to use an arrangement whereby the signals sent from station A over the teleghaph (or telephone) line to the distant stations will operate relays at one or more of those stations to short-circuit the inputs of the amplifiers forming parts of the direction finding apparatus, in order that temporarily the response of the apparatus to subsequent static crashes may be prevented. Such an arrangement for one station is indicated in the drawing at station C. When the telegraph circuit is opened at any point, the left-hand armature of relay $TR_3$ touches its left-hand contact and a circuit is completed through battery $B_3$ and the winding of relay $R_5$. This relay then operates and places short circuits on the inputs of the amplifiers associated with the antennæ $A_3$ and $A_4$ and the cathode ray tube of station C. The relay $R_5$ may, of course, be equipped with a locking circuit, as is the case with relay $R_4$ at station A, and also with a release key like key RK at station A. In order that the false short-circuiting of the amplifier inputs may not result when the operator at any one of the stations opens his key, an arrangement of a key K′ is provided. This key is preferably normally open but may be closed by the operator at station C when an observation is to be made; thus, under normal conditions, there will be no false operation of relay $R_5$.

It is to be understood that the invention is not necessarily limited by the specific description given above, but that its true scope is determined by the appended claims.

What is claimed is:

1. The method of determining the location of sources of static disturbances which consists in observing a static crash at a plurality of separated observation points, causing the observed crash to render the observing apparatus at a control observation point temporarily unresponsive to subsequent crashes, causing the observed crash to send out from said control point to the other observation point or points a signal to identify the observed crash, and communicating to one observation point the results of the observations made at the other observation point or points.

2. The method of determining the location of sources of static disturbances which consists in observing a static crash at a plurality of separated observation points, causing the observed crash to render the observing apparatus at a control observation point temporarily unresponsive to subsequent crashes, causing the observed crash to send out from said control point to the other observation point or points a signal to identify the observed crash, communicating to one observation point the results of the observations made at the other observation point or points, and locating the source of the observed static disturbance by triangulation.

3. The method of coordinating the observations made at a plurality of separated points to determine the location of sources of static disturbances, which consists in causing an observed static crash to render the observing apparatus at a control point temporarily unresponsive to subsequent crashes, and causing the observed crash to send out from said control point to the other observation point or points a signal serving to identify the observed crash.

4. The method of coordinating the observations made at a plurality of separated points to determine the location of sources of static disturbances, which consists in causing an observed static crash to render the observing apparatus at a control point temporarily unresponsive to subsequent crashes, causing the observed crash to send out from said control point to the other observation point or points a signal serving to identify the observed crash, and communicating to one observation point the results of the observations made at the other observation point or points.

5. A system for determining the location of sources of static disturbances, comprising a plurality of separated direction finding stations, means at one of the direction finding stations, responsive to an observed static crash, for rendering said station temporarily unresponsive to subsequent crashes, and means at said station responsive to an observed crash for sending to the other station or stations a signal to identify the observed crash.

6. A system for determining the location of sources of static disturbances, comprising a plurality of separated direction finding stations, means at one of the direction finding stations, responsive to an observed static crash, for rendering said station temporarily unresponsive to subsequent crashes, means at said station responive to an observed crash for sending to the other station or stations a signal to identify the observed crash, and means for transmitting intelligence from any direction finding station to the other station or stations of the system.

7. A system for determining the location of sources of static disturbances, comprising a plurality of separated direction finding stations, means at one of the direction finding stations responsive to an observed static crash for rendering said station unresponsive to subsequent crashes, means at said station responsive to an observed crash for sending to the other station or stations a signal to identify the observed crash, and means at said station for restoring the same to responsive condition with respect to subsequent crashes.

8. A system for determining the location of sources of static disturbances, comprising a plurality of separated direction finding stations, means at one of the direction finding stations, termed the control station, responsive to an observed static crash, for rendering said control station temporarily unresponsive to subsequent crashes, means at said control station responsive to an observed crash for sending to the other station or stations a signal to identify the observed crash, and means responsive to the observed crash at said control station for rendering a distant station of the system temporarily unresponsive to subsequent crashes.

9. The method of determining the location of sources of static disturbances, which consists in observing a static crash at a plurality of separated point, causing the observed crash to send out from one observation point to the other observation point or points a signal to identify the observed crash, and communicating to one observation point the results of the observations made at the other observation point or points.

10. In a system for determining the location of sources of static disturbances, said system comprising a plurality of separated observation stations, the method of avoiding confusion in the identification of observed static crashes which consist in cauing an observed crash to render the observing apparatus at one point temporarily unresponsive to subsequent crashes, causing the observed crash to send a signal to a distant point, and causing said signal to render the observing apparatus at said distant point temporarily unresponsive to subsequent crashes.

11. In a system for determining the location of sources of static disturbances, a plurality of separated direction finding stations, means at one of said stations responsive to an observed static crash for sending to the other station or stations a signal to identify the observed crash, and means at said other station or stations for receiving said signal.

In testimony whereof, I have signed my name to this specification this 19th day of April, 1929.

SAMUEL W. DEAN.